May 31, 1927.
T. A. GEORGE
MOWING MACHINE TONGUE SUPPORT
Filed Sept. 21, 1921
1,630,421
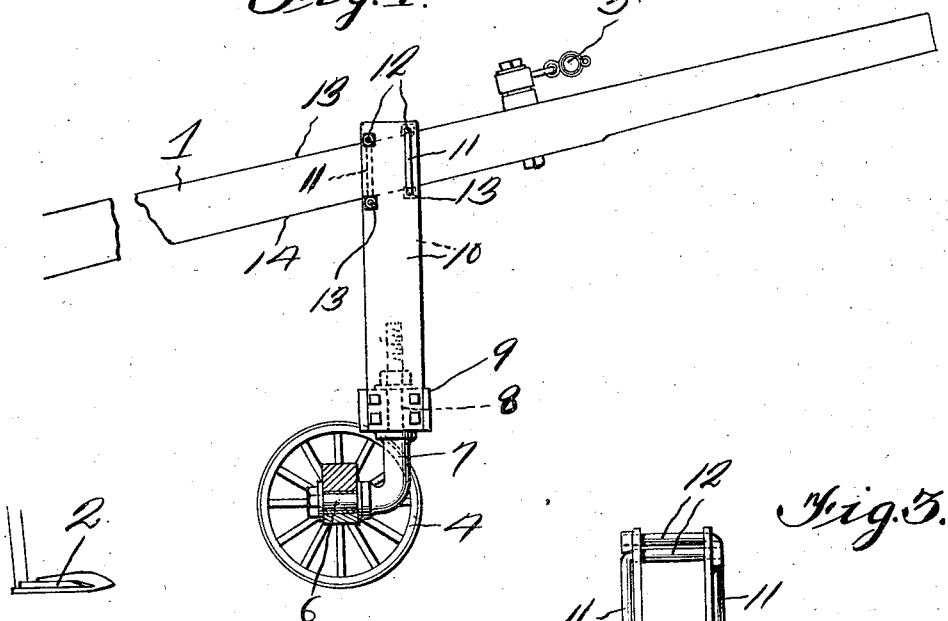
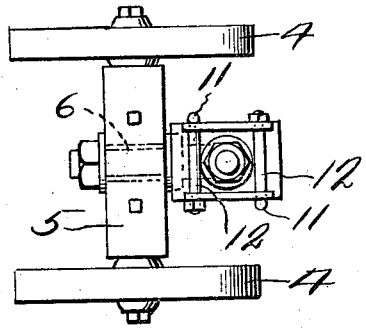
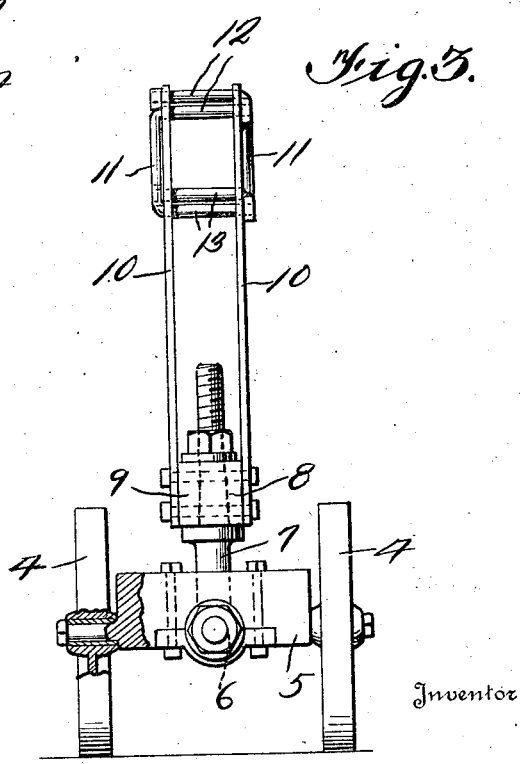
Inventor
T. A. George
By D. Swift
his Attorney Patented May 31, 1927.

1,630,421

UNITED STATES PATENT OFFICE.

THOMAS A. GEORGE, OF FANCY FARM, KENTUCKY.

MOWING-MACHINE-TONGUE SUPPORT.

Application filed September 21, 1921. Serial No. 502,165.

The invention relates to tongue supports for mowing machines and the like and has for its object to provide a wheeled tongue support for a mowing machine whereby the weight of the tongue and adjacent mechanism carried thereby will be relieved from the necks of the draft animals through the medium of wheels engaging the ground beneath the tongue and mounted on a bracket carried by the tongue in such a manner that the wheels will track properly in the forward movement of the mowing machine and will pivot in a vertical transverse plane for accommodating themselves to the irregularities of the ground.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a portion of a mowing machine tongue, showing the tongue support applied thereto.

Figure 2 is a top plan view of the tongue support.

Figure 3 is a rear elevation of the tongue support.

Referring to the drawings, the numeral 1 designates a conventional form of mowing machine, and 2 a cutter bar located adjacent the rear end thereof. It has been found that the weight of a mowing machine tongue is particularly heavy and tiring on the draft animals, which are hitched to singletrees 3, for the reason that the full weight of the tongue and mechanism carried thereby is on the necks of the draft animals. To overcome the above difficulty tongue supporting wheels 4 which are disposed beneath the tongue, engage the ground and support the weight of the tongue as the mowing machine moves forwardly. The wheels 4 are pivotally mounted on the ends of a transversely disposed member 5, which member is pivotally mounted on a rearwardly extending horizontally disposed arm 6 of a bracket 7. The bracket 7 is provided with an upwardly extending arm 8 which extends through a block 9 and pivots in said block. It will be seen that the bracket 7 may pivot in a horizontal plane in the block 9 thereby allowing the wheels to also move in a horizontal plane and also that the transversely disposed wheel supporting member may move in a transverse vertical plane to accommodate themselves to the irregularities of the surface of the field over which the mowing machine moves. By forming the bracket substantially right angle shaped, it will be seen that the wheels 4 will readily track according to the direction of movement of the mowing machine.

Secured to the sides of the block 9 are upwardly extending spaced bars 10, the upper ends of which engage on opposite sides of the tongue 1 and are held thereon by means of U-bolts 11 which U-bolts extend through the upper ends of the bars 10 with their arms 12 engaging the upper side 13 of the tongue and their arms 13 engaging the under side 14 of the tongue. The arms 12 and 13 are spaced from each other, therefore it will be seen that the bars 10 will be maintained in a vertical position for supporting the wheels 4 and the bracket 7.

From the above it will be seen that a tongue supporting device is provided which is particularly adapted to supporting the tongue of a mowing machine and so constructed that it may be easily and quickly applied to the tongue of a mowing machine without varying the construction of the tongue of the mowing machine. It will be also seen that the wheels 4 are universally supported in such a manner that they may move to properly track with the mowing machine during a turning operation to either side, but also move in a transverse vertical plane so as to conform to the irregularities of the ground.

The invention having been set forth what is claimed as new and useful is:—

A tongue supporting device for a mowing machine, said support comprising downwardly extending spaced parallel plates, the upper ends of said plates engaging opposite sides of the tongue, U-bolts extending through the plates and securing the same to the tongue, a bearing block disposed between the lower ends of the plates, transversely disposed bolts extending through the lower ends of the plates and the bearing block, a vertically disposed shaft pivotally mounted in the bearing block, said shaft terminating above said block between the plates, a nut on said shaft above the block and between the plates, said plates forming protecting means for said nut, the lower end of said shaft terminating in a rearwardly extending horizontally disposed integral shaft, a horizontally disposed axle pivotally mounted on the rearwardly extending shaft rearwardly of the vertically disposed shaft, and wheels pivoted to said axle, said rearwardly extending shaft being in the plane of the axis of the axle and wheels.

In testimony whereof I have signed my name to this specification.

THOMAS A. GEORGE.